March 12, 1968      E. A. ZADIG      3,373,441
LASER SPEED DETECTOR
Filed June 17, 1966
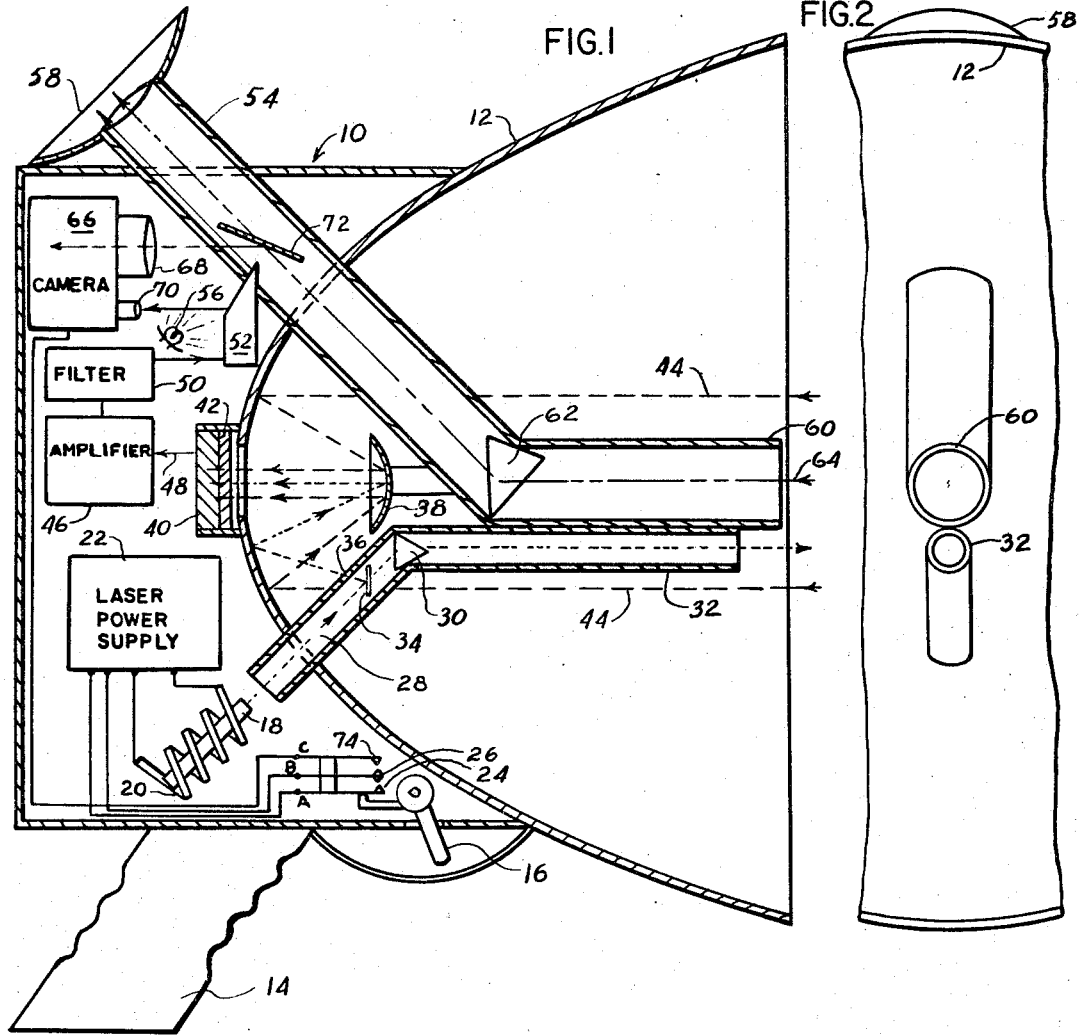
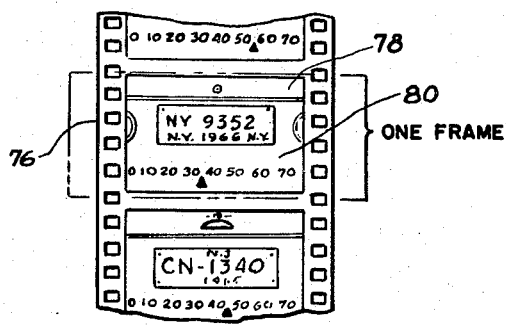
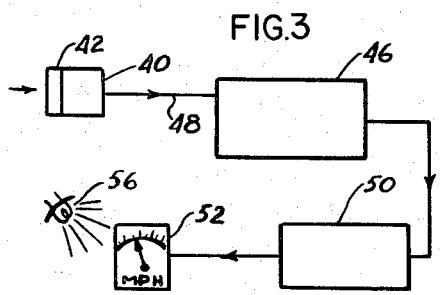
*INVENTOR.*
ERNEST A. ZADIG
BY
ATTORNEYS

United States Patent Office 3,373,441
Patented Mar. 12, 1968

3,373,441
LASER SPEED DETECTOR
Ernest A. Zadig, 1 Bouton St.,
South Norwalk, Conn. 06854
Filed June 17, 1966, Ser. No. 558,440
5 Claims. (Cl. 346—107)

This invention relates to a speed detector and, more particularly, relates to a speed detector using a light source having an extremely narrow beam and a viewing apparatus with a narrow field of view to enable simultaneous measurement and observation of a specified portion of the target vehicle.

Speed detection devices such as the radar devices measure the speed of moving vehicles by detection of the Doppler frequency shift in a signal emitted from the device, echoed off the moving target, and returned to the device. Unfortunately, in such devices, the beam is quite broad and many difficulties have been encountered in the practical application of such devices because of this beam spread.

For example, on roads having adjacent lanes carrying traffic in opposite directions, it is often quite difficult to get accurate speed readings because the beam will be reflected simultaneously from vehicles in each lane. It is then difficult to tell which target is being tracked with sufficient precision as to justify a speeding conviction, if used for that purpose.

It is, therefore, a primary object of the present invention to provide a speed detector which can more positively identify the target being tracked by the device.

It is a further object of this invention to provide a speed detector utilizing a narrow beam of light energy which can be used for the measurement of speed coupled with an optical means for simultaneously taking a picture of a portion of the target vehicle for identification purposes.

In accordance with these objects, there is provided, in a preferred embodiment of this invention, a speed detector comprising a laser for the generation of a continuous, narrow, coherent beam of light energy at a particular wave length. The wave length may be selected for convenience in laser construction since the frequency thereof is not critical for this application. The beam is projected toward a target and the light energy reflected therefrom is mixed with a portion of the light from the laser source to provide a heterodyne action. The result of mixing the projected and the return signal will be the generation of a beat frequency corresponding to the Doppler shift caused by the vehicle movement. The beat frequency is detected and applied to a meter to indicate the speed of the target vehicle. An optical arrangement is provided for aiming the detector. Preferably, this is a telescopic device of a narrow field of view which may, for example, view only the license plate of the moving vehicle or such other portion of the target useful for positive identification thereof.

The license plate so observed and the measured speed of the target vehicle are displayed on a single screen. Camera means are provided to selectively photograph the superimposed image of license plate and target speed. In this maner, the target vehicle is positively identified and the speed thereof recorded simultaneously.

Having briefly described this invention, it will be described in greater detail along with other objects and advantages in the following portions of the specification, which may best be understood by reference to the accompanying drawings, of which:

FIG. 1 is a cross section elevation view of a detector constructed in accordance with the present invention;

FIG. 2 is a partial front elevation view of the device shown in FIG. 1;

FIG. 3 is a schematic diagram of a portion of the apparatus shown in FIG. 1; and FIG. 4 is a plan view of a film strip produced by the device of FIG. 1.

In the figures, there is shown a laser speed detector comprising a housing 10 having parabolic reflector 12 mounted on the front thereof. For aiming and using the device, a supporting handle such as a pistol grip 14 may be conveniently applied thereto. The device may be energized by holding the pistol grip and tripping the trigger mechanism 16 of the device.

To generate a narrow coherent beam of light, there is provided a laser consisting of laser rod 18 around which is mounted on excitation light source 20. The laser rod will be constructed with semi-transparent end faces and will be excited by the light source 20 which may be a discharge light source. The rod may also be a gas tube although these are not as well developed at the present time. The excitation source is energized from a power supply 22 which is selectively energized by the closure of switch contacts 24 and 26 as the trigger 16 is pulled to a first position of energizing. When the laser is energized, the laser beam indicated by the dotted line 28 will be transmitted to the prism 30 and after deflection by the prism through tube 32 to the target vehicle on an axis concentric with the axis of the parabolic reflector 12. A semi-reflecting mirror 34 is provided to reflect a portion of the laser beam through the aperture 36 in the tube and after reflection from the parabolic reflector 12 and the parabolic secondary reflector 38 will be directed upon a photodetector 40 after passing through a filter 42. The filter 42 passes the wave length of the laser beam and screens out the other wave lengths, thereby to eliminate the effects of ambient light upon the photodetector.

The laser beam directed at the targe is refleced therefrom as indicaed by the dash lines 44 and after reflection from the parabolic reflector 12 and the secondary reflector 38, will also be directed upon the photodetector 40.

Thus, the light energy reflected from the target is aligned into a straight beam and is optically mixed with a portion of the light energy from the laser source. This provides an optical heterodyne action and the photodetector will generate an output signal, the frequency of which depends on the beat frequency between the two signals. The difference in frequency between the reflected signal and the generated signal is due to the Doppler shift of the moving target vehicle. Thus, the frequency of the signal generated by the photodetector and transmitted to amplifier 46 over lead 48 will be dependent upon target speed. The amplified signal is applied through an electrical filter 50 and applied to a frequency meter 52 calibrated in terms of speed. The meter indicator extends within the optical viewing tube 54 and is preferably provided with an illumination source 56 so as to project the reading upon the ground glass viewing screen 58. A portion of the target vehicle can be viewed through the optical viewing tube 60 utilizing prism 62 for proper angling of the image which then presented on the screen 58. The optical tube is concentric with the axis of the parabolic reflector 12.

Thus, the image projected upon the screen 58 is the simultaneous presentation of a portion of the target vehicle received along the optical axis 64 and a view of the meter indicating the target speed. Since the laser beam is a very narrow beam, it is preferred that the optical field of view be commensurately small. Thus, for example, the license plate of the moving target vehicle may encompass the entire field of view.

To permanently record the observed identification such as the license plate of the target vehicle and the target speed, a camera 66 having lens 68 and lens 70 with a simultaneous energized shutter therefor is provided. A partially reflecting mirror 72 is provided to reflect the image of the target vehicle identification into lens 68. Lens 70 is focused upon the meter 52. The camera is electrically tripped by continued movement of the trigger 16 and closure of contacts 26 and 74. A typical film from such camera is shown in FIG. 4 and in which one frame 76 will consist of the image 78 of the license plate of the target vehicle and a superimposed image 80 of the reading of meter 52 which, for example, in the United States, will be calibrated in terms of miles per hour.

Thus, there is provided in this detector, an instrument for positive identification of the target vehicle, measurement of the speed thereof and recording of the identification and the speed. Since the beam diameter is very small, there can be no question as to the target being viewed by the detector. That is, the measuring beam can be less than the optical view of the target.

This invention may be variously modified and embodied within the scope of the subjoined claims.

What is claimed is:

1. A speed detector comprising a laser for the generation of a narrow coherent beam of light, means for projecting said light towards a target vehicle, means for receiving a portion of said transmitted light reflected from said target vehicle, means for mixing said received reflected light with a portion of said generated beam, photodetector means to detect the beat frequency generated as a result of mixing said reflected and said generated beams, indicator means to indicate the target speed in response to variation in frequency of said photodetector signal, and optical means for viewing a portion of said target vehicle upon which said laser beam impinges.

2. A speed detector in accordance with claim 1 which includes camera means to record said viewed portion of said target vehicle and said meter reading on a single frame.

3. A speed detector in accordance with claim 1 which includes a parabolic reflector to receive the reflected beams, a second parabolic reflector to receive said focused beam and to reflect said focused beam in a straight line path upon said photodetector, and which includes a semitransparent mirror to reflect a portion of said generated laser beam upon said parabolic reflector and said secondary parabolic reflector so that said portion of said beam is directed upon said photodetector in axial alignment with said received beam.

4. A speed detector in accordance with claim 3 which includes a filter passing the wave length of said generated beam to screen the effects of ambient light from said photodetector.

5. A speed detector in accordance with claim 2 which includes a power source for said laser selectively energized by closure of a first switch means, and in which said camera is energized by closure of a second switch means in which said detector includes a trigger to energize said first switch means upon movement of said trigger for a first distance, and to energize said first and second switch means upon further movement of said trigger.

References Cited

UNITED STATES PATENTS

| | | | |
|---|---|---|---|
| 3,148,015 | 9/1964 | Weaver | 346—107 |
| 3,222,682 | 12/1965 | Scott | 346—107 |

RICHARD B. WILKINSON, *Primary Examiner.*

JOSEPH W. HARTARY, *Assistant Examiner.*